(12) United States Patent
Saitou et al.

(10) Patent No.: US 8,155,537 B2
(45) Date of Patent: Apr. 10, 2012

(54) OPTICAL RECEIVER CIRCUIT AND OPTICAL COUPLING DEVICE

(75) Inventors: Hisami Saitou, Kanagawa-ken (JP); Miki Furuya, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 311 days.

(21) Appl. No.: 12/652,401

(22) Filed: Jan. 5, 2010

(65) Prior Publication Data

US 2010/0172656 A1 Jul. 8, 2010

(30) Foreign Application Priority Data

Jan. 5, 2009 (JP) ................................. 2009-000429
Nov. 18, 2009 (JP) ................................. 2009-263153

(51) Int. Cl.
*H04B 10/06* (2006.01)

(52) U.S. Cl. ........................ 398/202; 398/208; 398/210

(58) Field of Classification Search ........... 398/202–210
See application file for complete search history.

(56) References Cited

U.S. PATENT DOCUMENTS

| | | | |
|---|---|---|---|
| 6,885,249 B2 | 4/2005 | Suzunaga | |
| 7,449,669 B2 | 11/2008 | Sakura | |
| 7,548,700 B2 * | 6/2009 | Furuya et al. | 398/202 |
| 7,787,780 B2 * | 8/2010 | Suzunaga | 398/210 |
| 2008/0205907 A1 * | 8/2008 | Kim et al. | 398/209 |
| 2008/0308715 A1 * | 12/2008 | Sakura | 250/214 A |
| 2008/0309407 A1 * | 12/2008 | Nakamura et al. | 330/253 |
| 2009/0028581 A1 * | 1/2009 | Duanmu et al. | 398/202 |

FOREIGN PATENT DOCUMENTS

| | | |
|---|---|---|
| JP | 2004179982 | 6/2004 |
| JP | 2007109944 | 4/2007 |

* cited by examiner

*Primary Examiner* — Dzung Tran
(74) *Attorney, Agent, or Firm* — Turocy & Watson, LLP (57) ABSTRACT

An optical receiver circuit and an optical coupling device, which includes: a light-receiving element; TIA operable to output a first voltage signal in response to input of the current signal; a voltage source operable to supply a second voltage signal serving as a reference voltage for determining pulse switching; a voltage source operable to supply a third voltage signal serving as a reference voltage for generating a shift control signal; a level shift circuit operable to output a voltage signal generated by subtracting a level shift voltage from the first voltage signal; a comparator operable to convert the first voltage signal to a pulse, and a controller operable to output the shift control signal outputting the first voltage signal shifted to a low-level side when the first voltage signal exceeds the third voltage signal, and outputting the first voltage signal without shifting after the output of the level shift circuit is lowered below the second voltage signal, are provided.

20 Claims, 8 Drawing Sheets

OPTICAL RECEIVER CIRCUIT AND OPTICAL COUPLING DEVICE

CROSS-REFERENCE TO RELATED APPLICATIONS

This application is based upon and claims the benefit of priority from the prior Japanese Patent Applications No. 2009-000429, filed on Jan. 5, 2009 and No. 2009-263153, filed on Nov. 18, 2009; the entire contents of which are incorporated herein by reference.

BACKGROUND OF THE INVENTION

1. Field of the Invention

This invention relates to an optical receiver circuit and an optical coupling device.

2. Background Art

An optical coupling device is used to enable signal transmission with electrical insulation between an input circuit and an output circuit. The optical coupling device includes an optical receiver circuit, which can receive an optical signal from a light-emitting element and convert the optical signal to an electrical signal.

Depending on the uses such as machine tools and process controllers, digital control using pulse signals is often applied, and hence it is necessary to reduce pulse width distortion.

Typically, to convert an optical signal to an electrical signal, a photocurrent detected by a PD (photodiode) is converted to a voltage signal by a transimpedance amplifier. The converted voltage signal is compared with an appropriate reference voltage by a comparator. To increase the accuracy of voltage comparison, the reference voltage is generated by superposing the output of another transimpedance amplifier having the same configuration with no photocurrent passed therethrough and an offset voltage as a bias.

In general, the efficiency of light emission from a light-emitting element decreases at high temperatures and across the ages, and there is also large variation (dispersion) between elements. Hence, typically, the reference voltage cannot be set to a high level in view of input decrease. On the other hand, the PD used as a light-receiving element has a high junction capacitance, which tends to blunt its waveform. Furthermore, the charge accumulated therein after extinction of input light is gradually released and increases the blunting of the falling edge. For these reasons, on the turn-off side, the transfer delay time is lengthened and tends to increase pulse width distortion.

Japanese Patent No. 3665635 discloses a technique related to an optical signal receiving circuit with reduced pulse width distortion, and an optical signal receiving semiconductor device. In this technique, a level shift circuit is provided between a transimpedance amplifier and a differential amplifier. The level shift circuit shifts the voltage to avoid the influence of saturation of the differential amplifier on the output signal.

However, in this technique, because the pulse is shifted entirely, the threshold changes between the first pulse and successive pulses, and the delay time varies accordingly. Furthermore, the delay time is adjusted with reference to the center value of the pulse. However, even if the optical signal from the light-emitting element is rapidly turned on/off, there is a certain delay in the response characteristics of the transimpedance amplifier. Therefore, such problems as increased delay time are caused when the pulse input becomes excessive.

SUMMARY OF THE INVENTION

According to an aspect of the invention, there is provided an optical receiver circuit including: a first light-receiving element operable to convert an optical signal to a current signal; a first transimpedance amplifier operable to output a first voltage signal in response to input of the current signal; a first voltage source operable to supply a second voltage signal serving as a reference voltage for determining pulse switching of the first voltage signal; a second voltage source operable to supply a third voltage signal serving as a reference voltage for generating a shift control signal in comparison with the first voltage signal; a level shift circuit operable to output a voltage signal generated by subtracting a level shift voltage from the first voltage signal in response to the shift control signal; a comparator having a first terminal for receiving the voltage signal from the level shift circuit and a second terminal for receiving the second voltage signal, the comparator being operable to convert the first voltage signal to a pulse; and a controller detecting that the first voltage signal has exceeded the third voltage signal, and operable to output the shift control signal, the controller outputting the shift control signal that is operable to output the level shift voltage and shift the first voltage signal to a low-level side by the level shift circuit when the first voltage signal exceeds the third voltage signal, and the controller outputting the shift control signal that returns the voltage signal from the level shift circuit to a high-level side during a prescribed period after the output of the level shift circuit is lowered below the second voltage signal.

According to an aspect of the invention, there is provided an optical receiver circuit including: a first light-receiving element operable to convert an optical signal to a current signal; a first transimpedance amplifier operable to output a first voltage signal in response to input of the current signal; a first voltage source operable to supply a second voltage signal serving as a reference voltage for determining pulse switching of the first voltage signal; a second voltage source operable to supply a third voltage signal serving as a reference voltage for generating a shift control signal in comparison with the first voltage; a level shift circuit operable to output a voltage signal generated by subtracting a level shift voltage from the first voltage signal in response to the shift control signal; a comparator having a first terminal for receiving the voltage signal from the level shift circuit and a second terminal for receiving the second voltage signal, the comparator being operable to convert the first voltage signal to a pulse; an output detector operable to detect switching of an output of the comparator; and a controller operable to detect that the first voltage signal exceeds the third voltage signal and operable to output the shift control signal, the controller outputting the shift control signal that is able to generate a first level shift voltage after the first voltage signal exceeds the third voltage signal and the switching of the output of the comparator is performed, and the controller outputting the shift control signal that is able to generate a second level shift voltage having lower voltage than the first level shift voltage after the first voltage signal falls and the switching of the output of the comparator is detected.

According to an aspect of the invention, there is provided an optical coupling device including: a optical receiver circuit; and a light-emitting element operable to emit an optical signal in a visible to infrared wavelength range, the optical receiver circuit including: a first light-receiving element operable to convert an optical signal to a current signal; a first transimpedance amplifier operable to output a first voltage signal in response to input of the current signal; a first voltage source operable to supply a second voltage signal serving as a reference voltage for determining pulse switching of the first voltage signal; a second voltage source operable to supply a third voltage signal serving as a reference voltage for generating a shift control signal in comparison with the first voltage signal; a level shift circuit operable to output a voltage signal generated by subtracting a level shift voltage from the first voltage signal in response to the shift control signal; a comparator having a first terminal for receiving the voltage signal from the level shift circuit and a second terminal for receiving the second voltage signal, the comparator being operable to convert the first voltage signal to a pulse; and a controller detecting that the first voltage signal has exceeded the third voltage signal, and operable to output the shift control signal, the controller outputting the shift control signal that is operable to output the level shift voltage and shift the first voltage signal to a low-level side when the first voltage signal exceeds the third voltage signal, and the controller outputting the shift control signal that returns the voltage signal from the level shift circuit to a high-level side after the output of the level shift circuit is lowered below the second voltage signal, the optical signal from the light-emitting element driven by an electrical input signal being converted by the optical receiver circuit to an electrical signal for output.

DETAILED DESCRIPTION OF THE INVENTION

Embodiments of the invention will now be described with reference to the drawings.

Figure 1:
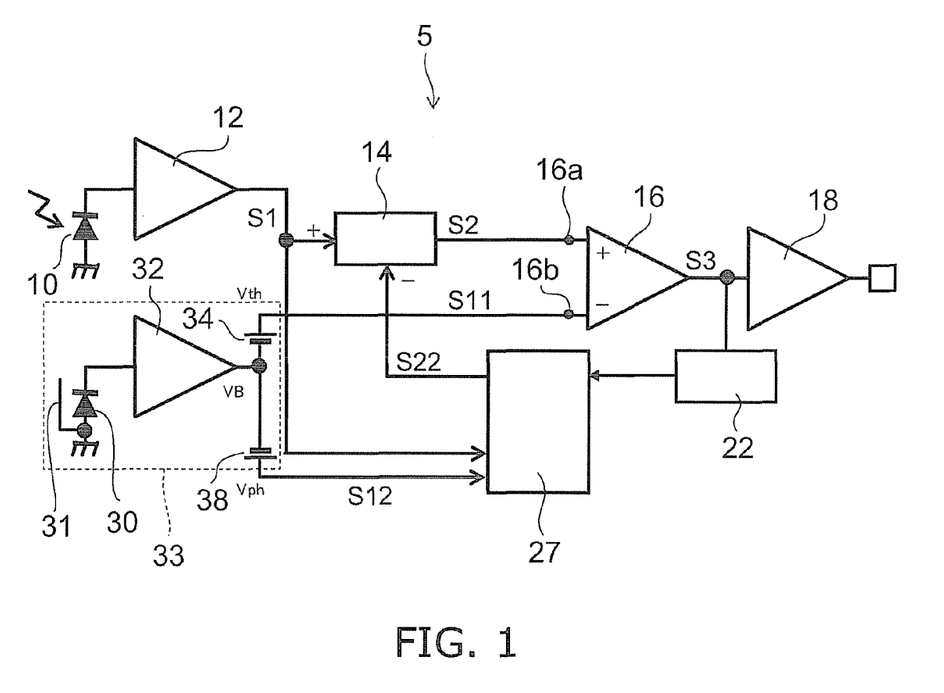
FIG. 1 is a block diagram of an optical receiver circuit according to a first embodiment.

FIG. 1 is a block diagram of an optical receiver circuit according to an embodiment.

An optical receiver circuit 5 includes a first light-receiving element 10 operable to convert an input optical signal to a current signal, a first transimpedance amplifier (TIA) 12 operable to output a first voltage signal S1 in response to input of the current signal, a reference voltage generating circuit 33 operable to output a second voltage signal S11 serving as a reference voltage for determining pulse switching and a third voltage signal S12 serving as a reference voltage for generating a shift control signal S22 in comparison with the first voltage signal S1, a level shift (LS) circuit 14 operable to shifting the level of the first voltage signal S1, a comparator 16, an output circuit 18, and a controller 27.

The reference voltage generating circuit 33 illustratively includes a second light-receiving element 30 having a light shield 31 for preventing the flow of photocurrent, a second transimpedance amplifier (TIA) 32 operable to output a voltage signal equal to that of the first TIA with no photocurrent, a voltage source 34 operable to supply a threshold voltage Vth that generates the second voltage signal S11 by superposing on the bias level VB of the voltage signal outputted from the second TIA 32, and a voltage source 38 operable to be superposed on the bias level VB to supply a voltage Vph generating the third voltage signal S12.

In the case where the first light-receiving element 10 and the second light-receiving element 20 have a same structure and are formed by a same process, accurate voltage comparison can easily be performed because the variation caused by dark current is canceled. Furthermore, in the case where the first TIA 12 and the second TIA 32 have a same structure and are formed by a same process, accurate voltage comparison can easily be performed because the output voltage of the second TIA 32 can be generally equal to that of the first TIA 12 with no photocurrent.

The third voltage signal S12 and the first voltage signal S1 are inputted to the controller 27. When that the first voltage signal S1 has exceeded the reference voltage Vph is detected, the controller 27 outputs the shift control signal S22 for controlling the LS circuit 14 to shift the voltage.

The output voltage signal S3 of the comparator 16 is inputted to an output detector 22. When that the comparator output has been switched (off) is detected, the controller 27 switches the shift control signal S22 so as to disable the voltage shift by the LS circuit 14.

The first voltage signal S1 is inputted to the level shift (LS) circuit 14, and its output S2 is inputted to a first (plus) terminal 16a of the comparator 16. The second voltage signal S11 outputted from the reference voltage generating circuit 33 is inputted to a second (minus) terminal 16b of the comparator 16, where the first voltage signal S1 is compared with the second voltage signal S11 and converted to a pulse. The output voltage signal S3 of the comparator 16 can be outputted outside through the output circuit 18.

By such configuration, for a prescribed duration while the first voltage signal S1 is outputted, the controller 27 can output the shift control signal S22 to the LS circuit 14. This allows the level shift circuit 14 to output the LS circuit output S2 shifted downward, i.e., the low-level side, by the amount of the shift voltage from the first voltage signal S1. That is, the level shift circuit 14 shifts the first voltage signal S1 in the direction of decreasing the amplitude of the high level of the first voltage signal S1.

On the other hand, for a prescribed duration while the first voltage signal S1 is not outputted, the first voltage signal S1 having been shifted downward is restored to allow the level shift circuit 14 to output its LS circuit output S2.

Typically, a circuit such as the controller 27 and the output detector 22 has a lag time, and hence the internal functions as a delay means. Thus, the shift control signal S22 is delayed behind the LS circuit output voltage signal S2. However, by suitably setting the delay time, the comparator 16 can be switched more reliably and achieve stable output operation. The configuration of the delay means, which can realize this, is described later in more detail.

Figure 2:
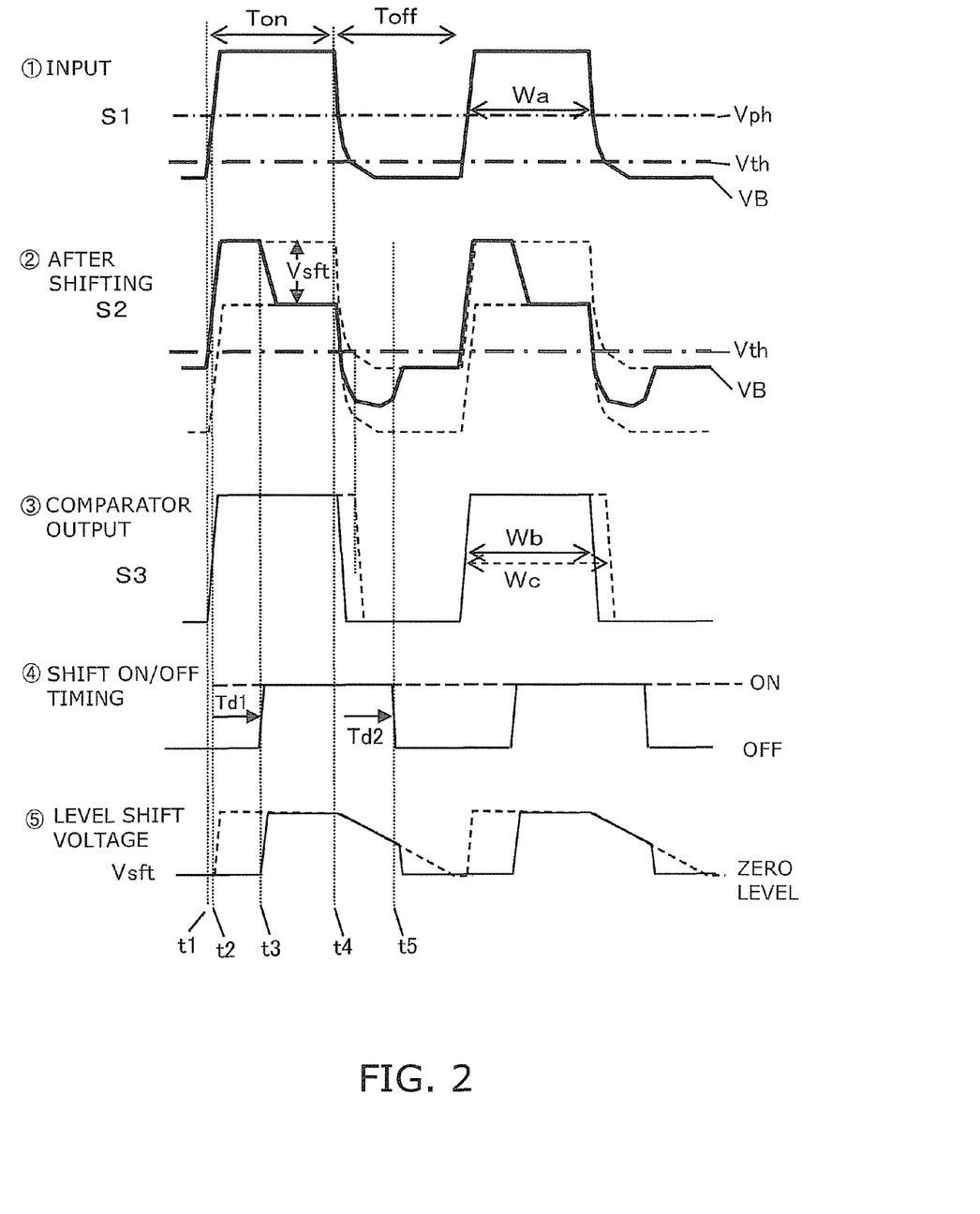
FIG. 2 is an operation waveform diagram.
Figure 3:
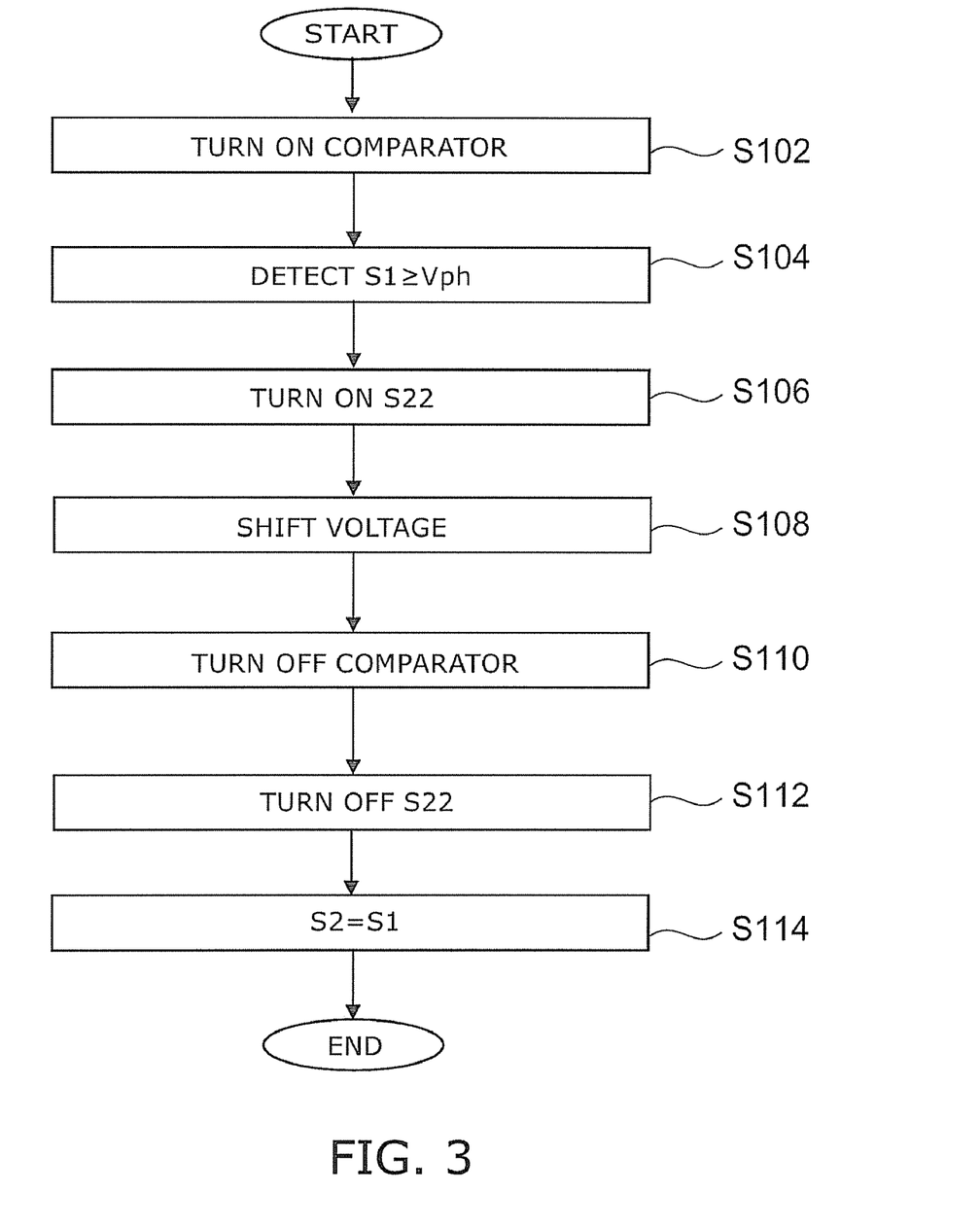
FIG. 3 is a flow chart showing the sequence of level shift control.

FIG. 2 is an operation waveform diagram of the optical receiver circuit according to this embodiment, where the vertical axis represents the first voltage signal S1, the LS circuit output voltage signal S2, the comparator output voltage signal S3, and the shift control signal S22, and the horizontal axis represents time t. Furthermore, FIG. 3 is a flow chart showing the sequence of level shift control.

The light-emitting element is pulse-driven, and its emitted light is incident on the first light-receiving element 10. The emitted light is converted by the first light-receiving element 10 to a current, which is inputted to the first TIA 12. At the falling edge of the first voltage signal S1 outputted from the first TIA 12 during the off-period Toff, the charge accumulated therein is gradually released, and the waveform exhibits large blunting.

The first voltage signal S1 is inputted to the level shift circuit 14, and its output S2 is inputted to the plus terminal 16a of the comparator 16. Here, the bias level VB is the first voltage signal S1 for no signal and no emitted light, and is illustratively equal to the output voltage of the second TIA 32.

On the other hand, the second voltage signal S11 is the threshold voltage Vth generated in the reference voltage generating circuit 33 by adding a suitable offset voltage to the bias voltage VB, and is inputted to the minus terminal 16b of the comparator 16. In the case where the emitted light has a wavelength in the visible to infrared range, the first light-receiving element 10 and the second light-receiving element 20 can be formed from a silicon material, which facilitates making the optical receiver circuit 5 one chip.

Under the initial condition, no shifting is performed by the LS circuit 14, and hence the LS circuit output voltage signal S2 is equal to the first voltage signal S1. However, at time t1 when it exceeds the threshold voltage Vth, the output voltage signal S3 from the comparator 16 starts to rise and is then turned on (S102).

As shown in FIG. 2, in the case where the input optical signal is a digital signal, it falls after the lapse of on-period Ton, and rises again after the lapse of off-period Toff. During this on-period Ton, the time width in which the amplitude of the first voltage signal S1 exceeds half its peak amplitude is referred to as the pulse width Wa.

At the rising and falling edge of the pulse, it takes time until the output of the first light-receiving element 10 and the first TIA 12 is stabilized. In particular, if the light-receiving element 10 is illustratively a photodiode or phototransistor, carriers accumulated during the on-period Ton do not vanish immediately upon extinction of light. Hence, as in the first voltage signal S1, a "tailing phenomenon" occurs in which the lower side of the falling waveform is trailed, and lengthens the transfer delay time.

The first voltage signal S1 starts to rise, and the controller 27 detects at time t2 that it has reached the reference voltage (Vph) (S104). Subsequently, the shift control signal S22 is inputted to the LS circuit 14, lagging by the rising delay time Td1 (=t3−t2) (S106). The comparator 16 has been switched on before the lapse of the rising delay time Td1.

In response to the shift control signal S22, the LS circuit output voltage signal S2 now outputted is lowered from the first voltage signal S1 by the shift voltage Vsft (S108).

After the lapse of the on-time Ton, the optical signal is turned off, and the first voltage signal 51 and the LS circuit output voltage signal S2 start to fall. At time t4 when the LS circuit output voltage signal S2 is lowered below the threshold voltage Vth, the output voltage signal S3 of the comparator 16 starts to fall and is then turned off (S110). Before that, the controller 27 detects that the first voltage signal S1 has become lower than the third voltage signal S12 (=Vph). However, typically, it is not immediately lowered due to the lag of the internal circuit and the delay circuit, and is turned off by the output detector 22.

The shift control signal S22 becomes zero at time t5 after the lapse of the falling delay time Td2 (=t5−t4) (S112). Hence, the shift voltage for the LS circuit output voltage signal S2 becomes zero, and a voltage signal equal to the first voltage signal S1 is inputted to the plus terminal 16a of the comparator 16 (S114).

Figure 4A:
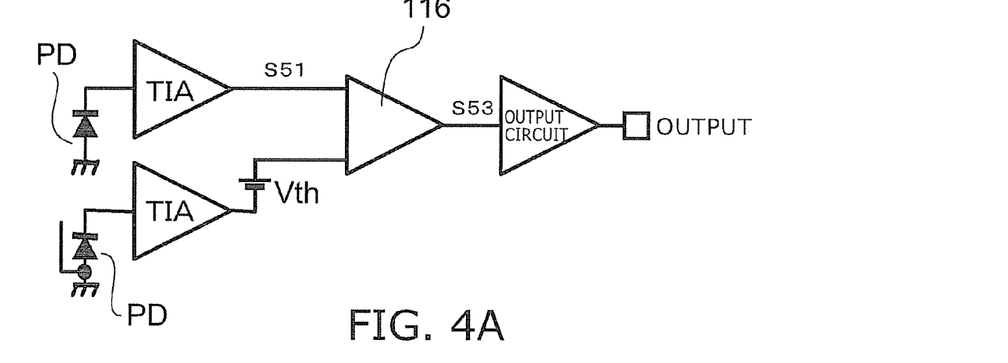
FIGS. 4A to 4D illustrate an optical receiver circuit according to a comparative example.
Figure 4B:
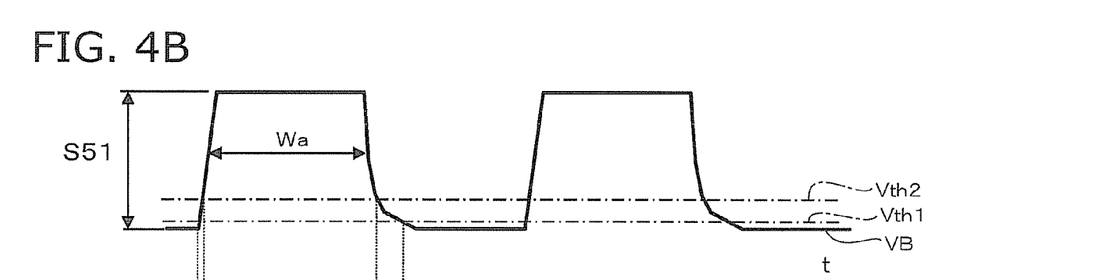
Figure 4C:
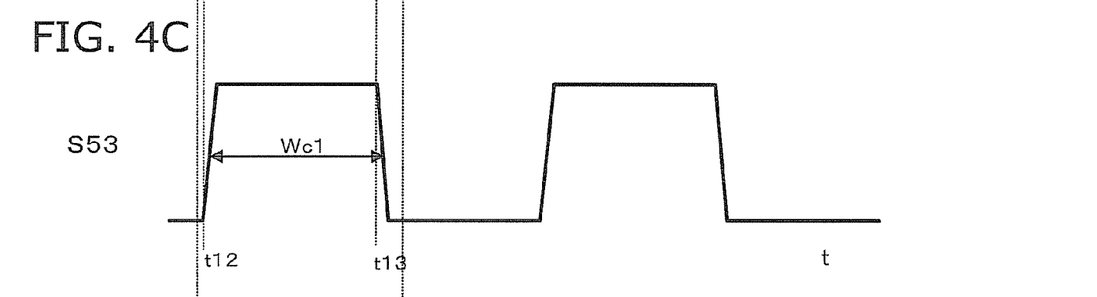
Figure 4D:
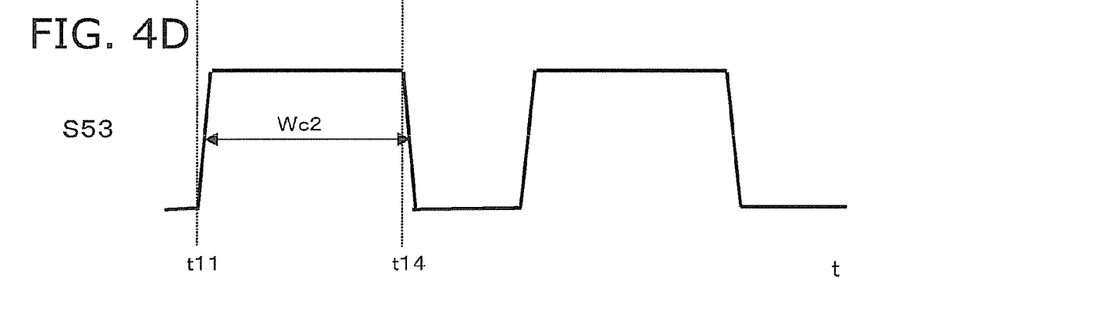

FIG. 4A is a configuration diagram of the optical receiver circuit according to a comparative example, FIG. 4B shows a waveform of the voltage signal S51, and FIGS. 4C and 4D show a waveform of the output voltage signal of the comparator.

As shown in FIG. 4A, the comparative example includes no level shift circuit, but the threshold voltage is set to a fixed voltage. In the following, a description is given of the cases where the threshold voltage is set to Vth1 and Vth2 (where Vth2>Vth1) for the voltage signal S51 as shown in FIG. 4B.

First, in FIG. 4C where a high Vth is set, the rising edge of the voltage signal S51 crosses the threshold voltage Vth2 at time t12, and the falling edge of the voltage signal S51 crosses the threshold voltage Vth2 at time t13. In this case, the pulse width Wa of the voltage signal S51 can be readily brought close to the pulse width Wc1 of the waveform of the output voltage S53 of the comparator 116.

On the other hand, for the threshold voltage Vth1 lower than the threshold voltage Vth2, the rising edge of the voltage signal S51 crosses the threshold voltage Vth1 at time t11, and the falling edge of the voltage signal S51 crosses the threshold voltage Vth1 at time t14. In this case, the pulse width Wc2 is wider than the pulse width Wc1. Thus, a relatively low threshold voltage for the value of the voltage signal S51 lags the time when the gently sloped curve of the "tailing phenomenon" at the falling edge crosses the threshold voltage. This lengthens the transfer delay time and increases pulse width distortion.

Furthermore, for a fast pulse, the pulse width Wa is shortened. This increases the rate of increase of the pulse width due to increased transfer delay time, and blunts the waveform more significantly.

In general, the light-emitting element is formed from laminated thin films made of compound semiconductors. Hence, it has large variation (dispersion) in optical output and light emission efficiency. Furthermore, the optical output and light emission efficiency have large variation due to temperature increase and across the ages. This significantly varies the signal levels of the current output of the light-receiving element and the output voltage of the TIA. If the threshold voltage Vth is set low so that the comparator output can be switched at a minimum signal level, a pulse with a high voltage level has a large difference from the threshold voltage. Hence, the time before switching at the falling edge is lengthened, and the transfer delay time is increased.

Furthermore, as shown in FIG. 4, the "tailing phenomenon" due to carrier accumulation in the light-receiving element also further increases the falling delay time. This increases the time difference from the rising edge, and increases pulse width distortion. Thus, the comparative example tends to cause pulse width distortion because the threshold voltage Vth is fixed with respect to the value of the voltage signal.

In contrast, in this embodiment, the first voltage signal S1 exceeding the reference voltage Vph is shifted downward by the amount of the shift voltage Vsft and inputted to the comparator 16. Because the first voltage signal S1 starts to fall from the voltage Vph, the difference between the threshold voltage Vth and the voltage Vph is small and can be kept generally constant. In this case, at the falling time, the output of the comparator 16 is switched before the waveform is lengthened by the "tailing phenomenon" to increase the delay time. This can suppress the falling time of the output voltage signal S3 of the comparator 16 from lengthening as shown by the dashed line. Thus, the pulse width distortion can be reduced, which facilitates achieving a faster pulse and increasing the amount of transmitted information.

Figure 5:
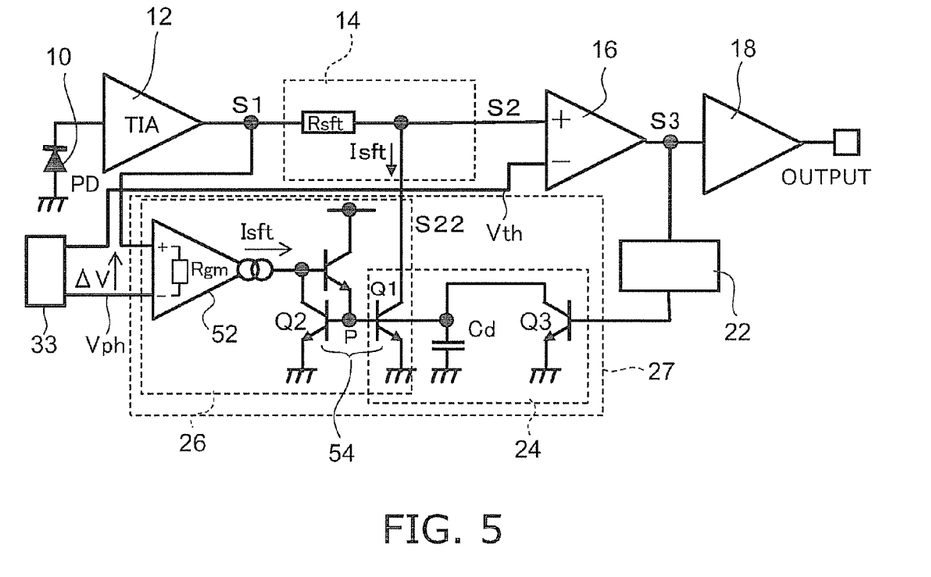
FIG. 5 illustrates the circuit configuration.

FIG. 5 illustrates the circuit configuration of this embodiment.

In this embodiment, the controller 27 includes a detector 26 and a delay circuit 24. It is noted that this circuit configuration is not limited to this figure.

The detector 26 includes a transconductance amplifier 52 and a current mirror circuit 54. The transconductance amplifier 52 can output a current Isft corresponding to the differential voltage ΔV between the first voltage signal S1 and the voltage Vph. The current Isft (the shift control signal) is given by the following formula:

$$Isft=\Delta V/Rgm$$

where ΔV=S1−Vph, and Rgm is the inverse of the transconductance.

In the current mirror circuit 54, the transistor Q1 outputs a current Isft, which is generally equal to the current Isft injected from the transconductance amplifier 52 into the transistor Q2. In this embodiment, the delay circuit is implemented by a capacitor Cd. Even if the input-side Isft becomes zero, the bias voltage at point P is maintained by the capacitor Cd, and the output current of Q1 does not immediately stop. Here, even without the transistor Q3 and the capacitor Cd, the delay time occurring in the current mirror circuit 54, the output detector 22 and the like may effectively serve as a delay circuit. Here, the output detector 22 detects whether the output voltage signal S3 from the comparator 16 is on the high-level side or on the low-level side, and outputs the detected signal toward the transistor Q3 via a built-in buffer circuit.

If the delay means is implemented by the delay circuit 24 including a capacitor, CR or the like, more reliable shift control can be achieved. For instance, for input of a voltage signal with a long falling time, after it starts to fall and before it reaches the threshold voltage, the shift control signal S22 becomes zero, and the LS circuit output voltage signal S2 returns to the original level. That is, because the LS circuit output voltage signal S2 returns upward, this case is close to the case of the fixed threshold voltage. In this case, a capacitor or CR circuit can be used to control the timing of voltage shift with a suitable delay time so that the pulse width distortion of the signal with a given rising and falling time can be readily reduced.

The level shift circuit 14 includes a resistor Rsft between the first TIA 12 and the plus terminal 16a of the comparator 16. The junction point between the resistor Rsft and the comparator 16 is connected to the transistor Q1 constituting the current mirror circuit 54. The current Isft flows through the resistor Rsft and the transistor Q1, and hence the shift voltage Vsft is determined by the following formula.

$$Vsft=Rsft\times Isft$$

Figure 7:
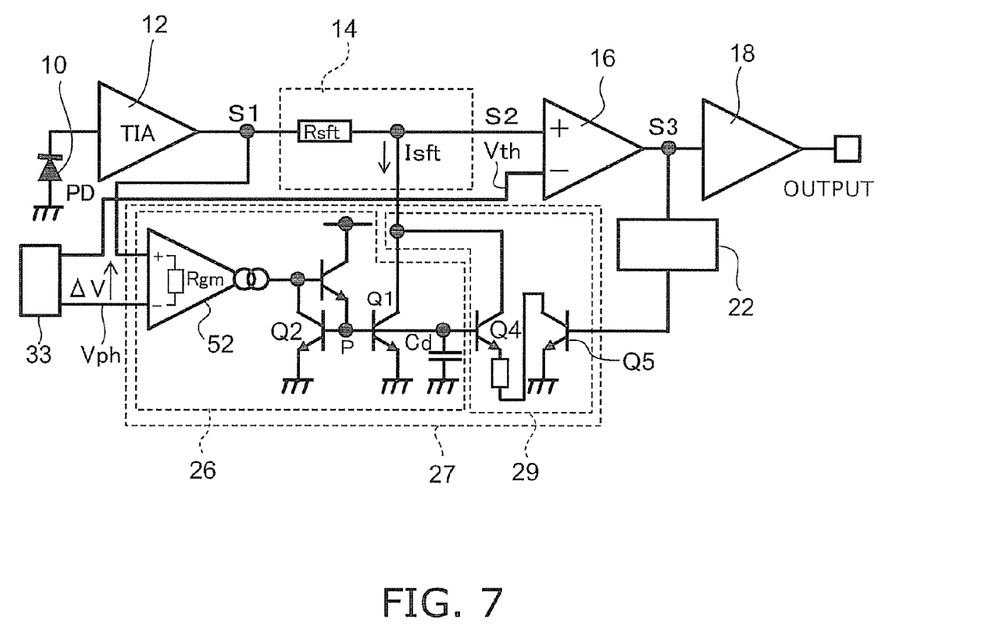
FIG. 7 is a block diagram of an optical receiver circuit according to a second embodiment.

FIG. 7 is a block diagram of an optical receiver circuit according to a second embodiment of the invention.

The optical receiver circuit according to this embodiment includes a first light-receiving element 10, a first TIA 12, a reference voltage generating circuit 33, an LS circuit 14, a comparator 16, an output detector 22, a controller 27, and an output circuit 18. The controller 27 includes a detector 26 including a transconductance amplifier 52 and a current mirror circuit 54, and a gain switching circuit 29.

The gain switching circuit 29 has a transistor Q4, and a transistor Q5, which is provided between the transistor Q4 and the output detector 22. The transistors Q1, Q2 and Q4 constitute a multi-connected current mirror circuit. Furthermore, the output detector 22 detects whether the output voltage signal S3 is on the high-level side or the low-level side, and outputs the detected signal toward the base of the transistor Q5 via a built-in buffer circuit. Here, the transistor Q5 is not limited to the bipolar transistor but may be the MOSFET.

Figure 8:
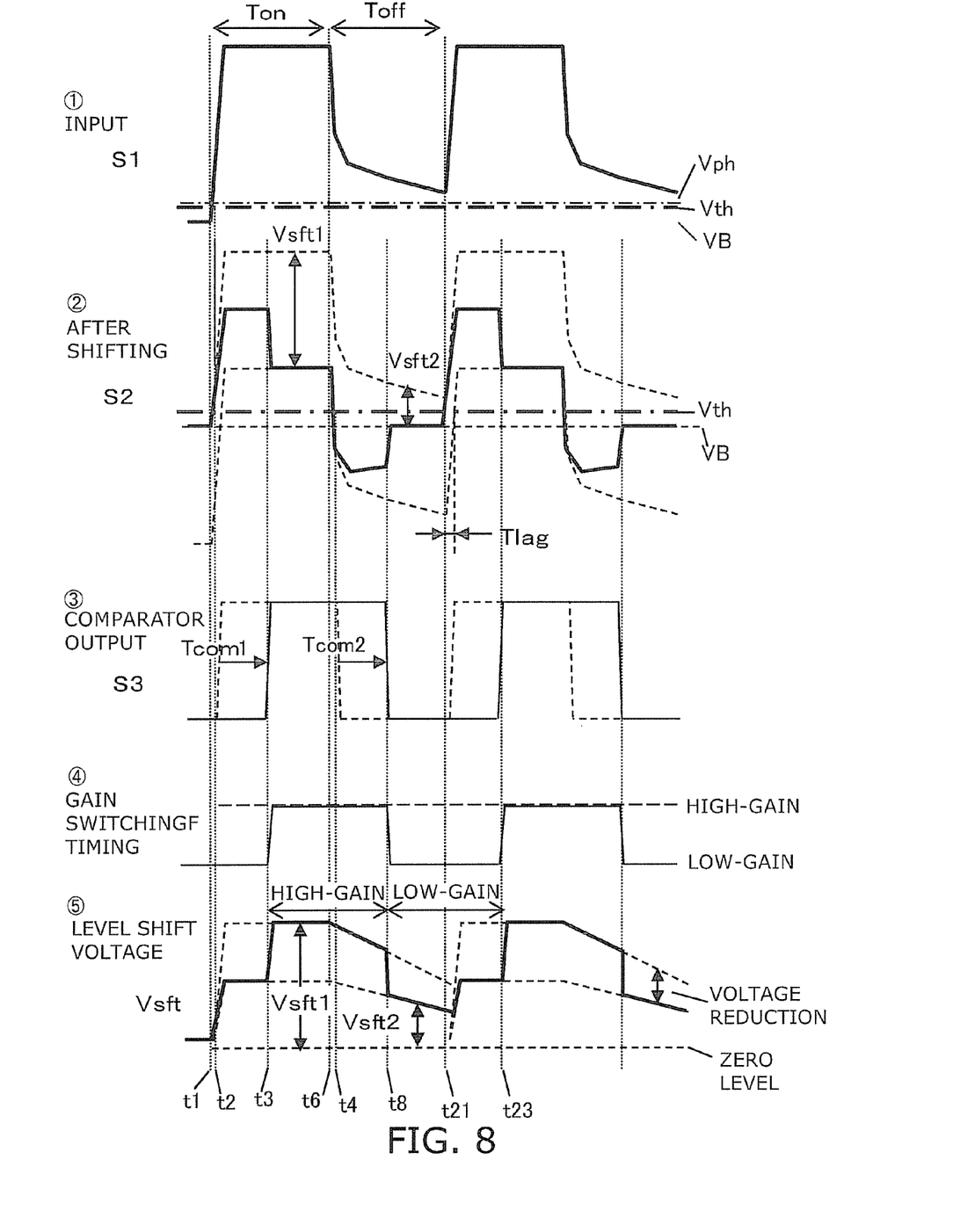
FIG. 8 is an operation waveform diagram.

FIG. 8 is an operation waveform diagram of the second embodiment.

When the first voltage signal S1 starts to rise and exceeds the threshold voltage Vth at time t1, the output voltage signal S3 from the comparator 16 can be turned on. When the controller 27 detects that the first voltage signal S1 has reached the reference voltage Vph, a level shift voltage Vsft is generated. Therefore, the LS circuit output voltage signal S2 assumes the value generated by subtracting the second level shift voltage Vsft2 from the first voltage signal S1 and starts to shift to the low-level side. Thus, the gain of the gain switching circuit 29 is on the low-level side then. In this case, according to the detected signal from the output detector 22, the transistor Q5 changes the current of the transistor Q4, and hence can control the gain of the gain switching circuit 29. When the transistor Q5 is turned off, the current Isft only includes the current of the transistor Q1 at time t8 and the second level shift voltage Vsft2 can be generated thereby.

The reference voltage Vph may be similar with the threshold voltage Vth. Furthermore, the comparator 16 generally has a delay time between the time at which the input voltage has reached the threshold voltage Vth and the time at which the output thereof has been switched. Here, the rising delay time is represented by Tcom1 and the falling delay time is represented by Tcom2. After the rising delay time Tcom1, the gain is switched to the high-gain side from the low-gain side by the gain switching circuit 29. In this case, the transistor Q5 is turned on, and the value of the current Isft assumes the sum of the collector current of the transistor Q1 and the collector current of the transistor Q4. During the high-gain period, the LS circuit output voltage signal S2 assumes the value generated by subtracting the first level shift voltage Vsft1 from the first voltage signal S1.

At time t6, the first voltage signal S1 start to fall. At time t4, the LS circuit output voltage signal S2 shifted to the low-level side is lowered below the threshold voltage Vth. When a falling delay time Tcom2 elapses after the time t4, the output voltage signal S3 of the comparator 16 starts to be switched. That is, even if the falling edge of the first voltage signal S1 undergoes tailing, the pulse width distortion is reduced due to small time difference between t6 and t4.

When the input level is higher, the tailing time becomes longer. Furthermore, it is considered that the first voltage signal S1 is not lowered below the threshold voltage Vth at the rise time of the next pulse for the fast signal as shown in FIG. 8.

On the other hand, when the output detector 22 detects the switching of the comparator 16 after the falling delay time Tcom2, the gain is switched to the low-gain side at time t8. Therefore, the second level shift voltage Vsft2, which is lower than the first level shift voltage Vsft1, can be generated. At the time between t8 and t21 during the low-gain period, the LS circuit output voltage signal S2 assumes the value generated by subtracting the second level shift voltage Vsft2 from the first voltage signal S1. Therefore, the LS circuit output voltage signal S2 can be preferably lowered than the threshold voltage Vth and near the bias level VB easily.

In general, a pn junction provided on the substrate side of a one-chip optical receiver circuit can be used as a photodiode to increase the light-receiving sensitivity. In this case, carriers generated in a deep region from the surface of the substrate experience a long transit time, and hence tends to cause tailing in the falling time. Furthermore, as the incident light intensity increases, a larger amount of carriers are generated and increase the effect of tailing. In such cases, it may take several hundred ns until the tailing voltage is sufficiently lowered. In this embodiment, in the case of such a long tailing time during which the fast light pulse such as 50 Mbps rises, the malfunction of the comparator is prevented, and the pulse width distortion can be reduced.

Figure 9:
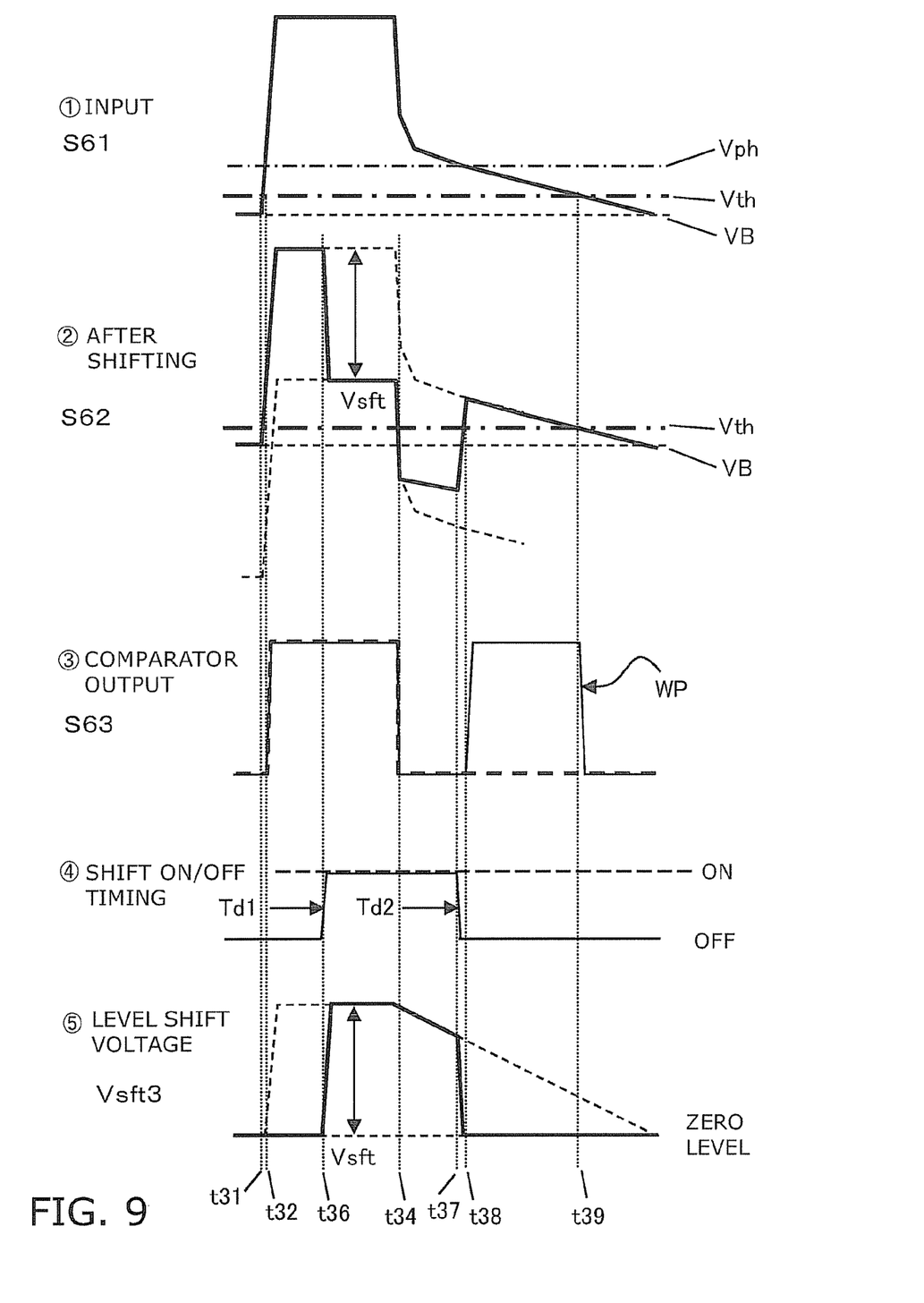
FIG. 9 is an operation waveform diagram of the comparative example.

FIG. 9 is an operation waveform diagram of an optical receiver circuit according to a comparative example with no gain switching circuit.

In this comparative example, when the LS circuit output voltage signal S62 is lowered to the threshold voltage Vth at time t34, the shift ON/OFF timing signal starts to be turned off at the time t37 when the falling delay time td2 elapses. Furthermore, the level shift voltage Vsft3 also starts to be lowered. In the case of a long tailing time, the comparator has been switched on when the first voltage signal S61 is raised to the threshold voltage Vth and the level shift voltage Vsft3 becomes zero. The LS circuit output voltage signal S62 returned to the high-level side at time t38 is lowered to the threshold voltage Vth at time t39, and the output voltage signal S63 of the comparator is switched off. That is, undesirably, the pulse WP is caused by a malfunction.

In contrast, in the second embodiment, during the period Toff, the second level shift voltage Vsft2 is not lowered to zero and hence the comparator 16 can be suppressed from malfunctioning.

Furthermore, the level shift voltage Vsft can be reduced by the gain switching circuit 29. Therefore, the LS circuit output voltage signal S2 can be shifted near the bias level VB. Here, when the second and subsequent pulses are inputted, the LS circuit output voltage signal S2 can be generated by subtracting a no-zero second level shift voltage Vsft2 from the first voltage signal S1. Thus, the LS circuit output voltage signal S2 is brought close to the bias level VB and the delay time Tlag at the rise time can be reduced as shown in FIG. 8. Thus, the pulse width distortion at the rise time can also be readily reduced.

Figure 6:
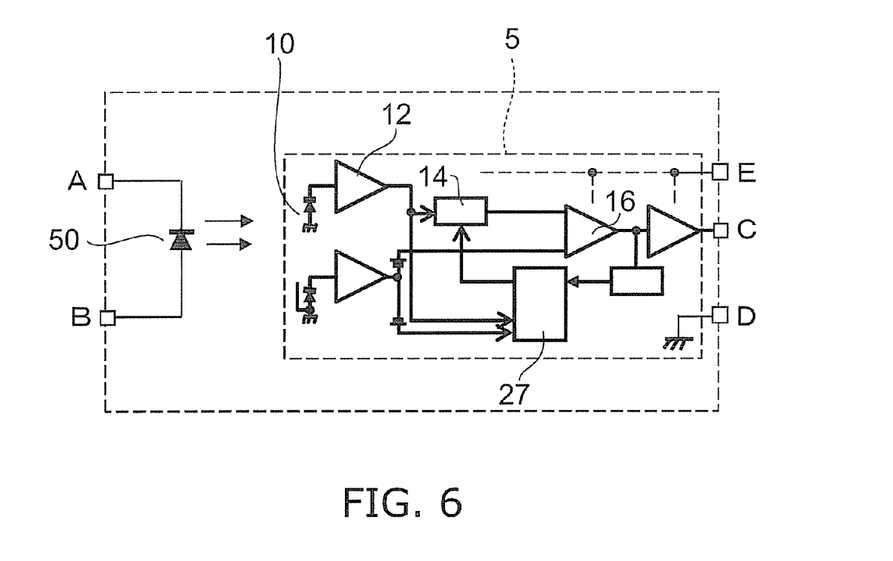
FIG. 6 is a block diagram of an optical coupling device.

FIG. 6 is a block diagram of an optical coupling device according to the embodiments.

The optical coupling device includes an optical receiver circuit 5 and a light-emitting element 50.

The light-emitting element 50, which is connected to input terminals A and B, receives as input an electrical signal therefrom. The optical receiver circuit, which is connected to output terminals C and D and a power supply terminal E, can receive an optical signal from the light-emitting element 50 and output it as an electrical signal. This enables signal transfer from the input terminals A and B to the output terminals C and D (ground) and the power supply terminal E with the power supply systems insulated from each other. The optical coupling device according to this embodiment, which includes an optical receiver circuit capable of suppressing pulse width distortion in a wide range of input level, can be widely used in electronic devices for industrial use, office automation, data transmission, and home use.

The embodiments of the invention have been described with reference to the drawings. However, the invention is not limited to these embodiments. Those skilled in the art can variously modify the shape, size, material, layout and the like of the light-receiving element, transimpedance amplifier, level shift circuit, shift control circuit, reference voltage generating circuit, delay circuit, threshold voltage source, comparator, and light-emitting element constituting the embodiments of the invention, and such modifications are also encompassed within the scope of the invention as long as they do not depart from the spirit of the invention.

The invention claimed is:
1. An optical receiver circuit comprising:
a first light-receiving element operable to convert an optical signal to a current signal;
a first transimpedance amplifier operable to output a first voltage signal in response to input of the current signal;
a first voltage source operable to supply a second voltage signal serving as a reference voltage for determining pulse switching of the first voltage signal;
a second voltage source operable to supply a third voltage signal serving as a reference voltage for generating a shift control signal in comparison with the first voltage signal;
a level shift circuit operable to output a voltage signal generated by subtracting a level shift voltage from the first voltage signal in response to the shift control signal;
a comparator having a first terminal for receiving the voltage signal from the level shift circuit and a second terminal for receiving the second voltage signal, the comparator being operable to convert the first voltage signal to a pulse; and
a controller detecting that the first voltage signal has exceeded the third voltage signal, and operable to output the shift control signal,
the controller outputting the shift control signal that is operable to output the level shift voltage and shift the first voltage signal to a low-level side by the level shift circuit when the first voltage signal exceeds the third voltage signal, and
the controller outputting the shift control signal that returns the voltage signal from the level shift circuit to a high-level side after the output of the level shift circuit is lowered below the second voltage signal.

2. The circuit according to claim 1, wherein the level shift circuit includes a level shift resistance connected between the first transimpedance amplifier and the first terminal of the comparator.

3. The circuit according to claim 2, wherein the controller includes a transconductance amplifier operable to output an output current when the first voltage signal exceeds the third voltage signal.

4. The circuit according to claim 3, wherein the controller further includes a current mirror circuit operable to supply the level shift resistance with a level shift current based on the output current of the transconductance amplifier.

5. The circuit according to claim 4, wherein the first voltage signal can be shifted to the low-level side by the level shift voltage given by the product of the level shift current and the level shift resistance.

6. The circuit according to claim 1, further comprising:
a second light-receiving element being operable to convert an optical signal to an electrical signal and having a light shield; and
a second transimpedance amplifier operable to output a voltage signal in response to input of the current signal from the second light-receiving element,
the second voltage signal being sum of the voltage signal of the second transimpedance amplifier and an output voltage of the first voltage source, and
the third voltage signal being sum of the voltage signal of the second transimpedance amplifier and an output voltage of the second voltage source.

7. The circuit according to claim 1, wherein the controller outputs the shift control signal with a delay after the first voltage signal exceeds the third voltage signal and an output of the comparator is switched, and when the first voltage signal falls, the controller outputs the shift control signal with a delay to maintain shifted state of the first voltage signal until the output of the comparator is switched.

8. The circuit according to claim 7, wherein the level shift circuit includes a level shift resistance connected between the first transimpedance amplifier and the first terminal of the comparator.

9. The circuit according to claim 8, wherein the controller includes a transconductance amplifier operable to output an output current when the first voltage signal exceeds the third voltage signal.

10. The circuit according to claim 9, wherein the controller further includes a current mirror circuit operable to supply the level shift resistance with a level shift current based on the output current of the transconductance amplifier.

11. The circuit according to claim 10, wherein the output current of the transconductance amplifier is generally equal to the level shift current.

12. The circuit according to claim 10, wherein the first voltage signal can be shifted to the low-level side by a level shift voltage given by a product of the level shift current and the level shift resistance.

13. The circuit according to claim 12, further comprising:
an output detector operable to detect switching of the output of the comparator when the output of the level shift circuit is lowered below the second voltage signal,
the controller outputting the level shift signal that returns the first voltage signal to the high-level side after the switching of the output of the comparator is detected and a prescribed period elapses.

14. The circuit according to claim 13, wherein the controller includes a delay circuit including at least a capacitor and provided on a path of the shift control signal inputted to the level shift circuit.

15. The circuit according to claim 14, wherein
the capacitor is connected to the base of a transistor constituting the current mirror circuit, and
the level shift current can be outputted while charge is accumulated in the capacitor even when the comparator output is turned off.

16. An optical receiver circuit comprising:
a first light-receiving element operable to convert an optical signal to a current signal;
a first transimpedance amplifier operable to output a first voltage signal in response to input of the current signal;
a first voltage source operable to supply a second voltage signal serving as a reference voltage for determining pulse switching of the first voltage signal;
a second voltage source operable to supply a third voltage signal serving as a reference voltage for generating a shift control signal in comparison with the first voltage signal;
a level shift circuit operable to output a voltage signal generated by subtracting a level shift voltage from the first voltage signal in response to the shift control signal;
a comparator having a first terminal for receiving the voltage signal from the level shift circuit and a second terminal for receiving the second voltage signal, the comparator being operable to convert the first voltage signal to a pulse;
an output detector operable to detect switching of an output of the comparator; and
a controller operable to detect that the first voltage signal exceeds the third voltage signal, and operable to output the shift control signal,
the controller outputting the shift control signal that is able to generate a first level shift voltage after the first voltage signal exceeds the third voltage signal and the switching of the output of the comparator output is performed, and
the controller outputting the shift control signal that is able to generate a second level shift voltage having lower voltage than the first level shift voltage after the first voltage signal falls and the switching of the output of the comparator is detected.

17. The circuit according to claim 16, wherein the level shift circuit includes a level shift resistance connected between the first transimpedance amplifier and the first terminal of the comparator.

18. The circuit according to claim 17, wherein the controller includes a transconductance amplifier operable to output an output current when the first voltage signal exceeds the third voltage signal.

19. The circuit according to claim 18, wherein the level shift voltage is a product of a level shift current based on the output current of the transconductance amplifier and the level shift resistance.

20. An optical coupling device comprising:
a optical receiver circuit; and
a light-emitting element operable to emit an optical signal in a visible to infrared wavelength range,
the optical receiver circuit including:
a first light-receiving element operable to convert an optical signal to a current signal;
a first transimpedance amplifier operable to output a first voltage signal in response to input of the current signal;
a first voltage source operable to supply a second voltage signal serving as a reference voltage for determining pulse switching of the first voltage signal;
a second voltage source operable to supply a third voltage signal serving as a reference voltage for generating a shift control signal in comparison with the first voltage signal;
a level shift circuit operable to output a voltage signal generated by subtracting a level shift voltage from the first voltage signal in response to the shift control signal;
a comparator having a first terminal for receiving the voltage signal from the level shift circuit and a second terminal for receiving the second voltage signal, the comparator being operable to convert the first voltage signal to a pulse; and
a controller detecting that the first voltage signal has exceeded the third voltage signal, and operable to output the shift control signal,
the controller outputting the shift control signal that is operable to output the level shift voltage and shift the first voltage signal to low-level side when the first voltage signal exceeds the third voltage signal, and
the controller outputting the shift control signal that returns the voltage signal from the level shift circuit to a high-level side after the output of the level shift circuit is lowered below the second voltage signal,
the optical signal from the light-emitting element driven by an electrical input signal being converted by the optical receiver circuit to an electrical signal for output.

* * * * *